US007027188B2

(12) United States Patent
Takeuchi et al.

(10) Patent No.: US 7,027,188 B2
(45) Date of Patent: Apr. 11, 2006

(54) IMAGE PROCESSING DEVICE AND METHOD, AND RECORDING MEDIUM

(75) Inventors: Hideto Takeuchi, Tokyo (JP); Katsushi Ikeuchi, 2-12, Umegaoka Aoba-ku, Yokohama-shi, Kanagawa (JP)

(73) Assignees: Sony Corporation, Tokyo (JP); Katsushi Ikeuchi, Kanagawa (JP)

( * ) Notice: Subject to any disclaimer, the term of this patent is extended or adjusted under 35 U.S.C. 154(b) by 905 days.

(21) Appl. No.: 09/950,391

(22) Filed: Sep. 10, 2001

(65) Prior Publication Data

US 2003/0185459 A1 Oct. 2, 2003

(30) Foreign Application Priority Data

Sep. 11, 2000 (JP) .......................... P2000-275034

(51) Int. Cl.
*H04N 1/40* (2006.01)

(52) U.S. Cl. ....................................... 358/2.1; 382/199

(58) Field of Classification Search ................ 358/1.9, 358/2.1, 400, 500; 382/266–271, 260–262, 382/199–200

See application file for complete search history.

(56) References Cited

U.S. PATENT DOCUMENTS 6,416,186 B1 * 7/2002 Nakamura .................. 353/69
6,636,627 B1 * 10/2003 Oosawa ...................... 382/154
6,724,383 B1 * 4/2004 Herken et al. ............. 345/420
6,744,440 B1 * 6/2004 Nakamura .................. 345/582

FOREIGN PATENT DOCUMENTS

JP 2002024830 A * 1/2002

OTHER PUBLICATIONS

Peter J. Burt et al., “A Multiresolution Spline with Application to Image Mosaics”, Oct. 1983 pp. 217-236.
Sadahiko Mihashi et al., “Photometric Image-Based Rendering for Synthesizing under a Virtual Lighting Condition”.
Imazi Sato et al., “Seamless integration of a real scene and computer generated objects based on a real illumination distribution”, pp. 23-32.

* cited by examiner

*Primary Examiner*—Thomas D. Lee
*Assistant Examiner*—Stephen Brinich
(74) *Attorney, Agent, or Firm*—Bell, Boyd & Lloyd LLC

(57) ABSTRACT

A target object texture mapping unit makes correspondence of image data of a measured target object to shape data. A reference object texture mapping unit makes correspondence of image data of a measured reference object to shape model of the reference object. A normal correspondence making unit compares normal data of the target object with normal data of the reference object and makes correspondence of the normals having the corresponding directions. A light source influence eliminating unit prepares target object light source influence-eliminated image data on the basis of the correspondence made by the normal correspondence making unit. A correction light source influence adding unit adds an influence of a light source to the target object light source influence-eliminated image data, thus preparing target object corrected image data.

48 Claims, 8 Drawing Sheets

IMAGE PROCESSING DEVICE AND METHOD, AND RECORDING MEDIUM

BACKGROUND OF THE INVENTION

The present invention relates to an image processing device and method and a recording medium, and particularly to an image processing device and method and a recording medium which enable correction of the influence of a light source on a measuring target object.

A technique for joining adjacent images of a number of so-called two-dimensional images (ordinary photographs or the like) is called mosaic processing. Generally, when the mosaic processing using a number of images is carried out, the overall densities and color tones of the respective images are made as coincident with one another as possible in advance. After that, in order to prevent the change of the color tone from becoming discontinuous in the boundary portion where the adjacent images are merged, blending of the density around the merging point is carried out.

There are several methods for making the overall densities and color tones of the respective images coincident with one another. As a method for correcting the difference in density and color tone, for example, there is a method called histogram coincidence method for converting the color tone of one image so that the histograms of the adjacent images in the overlap portion coincide with each other as much as possible, or a method called linear density converting method for finding the linear relation by a least square method and converting the color tone, which is a correction method on the assumption that linear conversion is realized between the pixels in the overlap portion. These methods are described in detail, for example, in the "Image Processing Standard Textbook" of the Image Information Education Promotion Society.

For the blending near the merging point, an α-blending method or the like is used for that the density of data in the overlap portion. In this method, the density is proportionally distributed over a predetermined section on both sides of the merging point.

In the α-blending, for example, the blending width is changed depending on the difference in density, or blending is carried out for each frequency band. These techniques are described in detail, for example, in Peter J. Burt and Edward H. Adelson, "A Multiresolution Spline with Application to Image Mosaics," ACM Transactions on Graphics, Vol.2, No.4, October 1983, pages 217–236.

Meanwhile, in the case where the histogram coincidence method or the linear density converting method is used for textures (images) obtained by three-dimensional sensing, the unnaturalness of the merging of color tones in a seam part when merging textures cannot be eliminated because the relation between the object and the lighting is not considered at all.

In the α-blending method, the difference in color tone near the merging part can be eliminated to a certain extent. However, it cannot cope with the shooting of a moving target object with a fixed measuring device and lighting. That is, while the merging of color tones in the seam part can be corrected, the unevenness due to the lighting cannot be corrected.

Thus, apart from the mosaic processing for a two-dimensional image as a target, there is an image processing method for reproducing a three-dimensional model as an image, for example, a method called model-based rendering (MBR) or image-based rendering (IBR). This IBR enables generation of a realistic image by directly using a real image which is obtained by actually shooting a target object.

However, since most IBR techniques handle only geometric changes of the sight accompanied by changes of the visual point, which are essentially different from changes of the sight accompanied by changes of the light source, it is difficult to directly apply the conventional mosaic processing for a two-dimensional image.

Thus, there is a method called photometric image-based rendering, in which a number of real images having different light source directions are inputted and appropriately combined to generate an image of an arbitrary light source direction. This method is described in detail, for example, in Sadahiko Mitsuhashi, Hajime Miyaki, Yasuhiro Mukaikawa, and Ken Shakunaga, "Photometric Image-Based Rendering for Generation of Image of Arbitrary Light Source," Shingaku Giho, PRMU-98-125, November 1998, pp. 17–24.

In this method, however, a number of light sources cannot be used. Therefore, it is difficult to prepare model data using a number of light sources.

As described above, in the conventionally proposed method, if a target object is rotated and shot from a number of angles, the light casting direction changes, thus making the shading on the target object uneven in the images picked up from the respective directions.

Other than the above-described methods, there is proposed a method for shooting the environment in which an object is shot, by a camera or the like, and reproducing the light source completely. This method is described in detail, for example, in Imari Sato, Yoichi Sato, and Katsuhumi Ikeuchi, "Superimposition of a virtual object onto a real image in consideration of optical consistency," the Third Intelligence Information Media Symposium, December 1997, 23–32.

However, this method requires expensive parts such as a fish-eye lens and a CCD (charge coupled device) camera.

SUMMARY OF THE INVENTION

In view of the foregoing status of the art, it is an object of the present invention to enable elimination of the influence of a light source and preparation of a corrected image of a target object at a low cost and with a high accuracy.

According to the present invention, there is provided an image processing device for correcting the influence of a light source on a target object by measuring the target object and a reference object, the shape and image of which are known, the device including: a shape measuring unit for measuring the shape of the target object; an image pickup unit for picking up an image of the target object; a preparation unit for preparing a target object normal vector from the shape of the target object measured by the shape measuring unit; a correspondence making unit for making correspondence of the target object normal vector prepared by the preparation part to a reference object normal vector obtained from the shape of the reference object; and an image correcting unit for correcting the image of the target object on the basis of the correspondence made by the correspondence making unit.

According to the present invention, there is also provided an image processing method for an image processing device for correcting the influence of a light source on a target object by measuring the target object and a reference object, the shape and image of which are known, the method including: a shape measuring step of measuring the shape of the target object; an image pickup step of picking up an image of the target object; a preparation step of preparing a target object normal vector from the shape of the target object measured by the processing of the shape measuring step; a correspondence making step of making correspondence of the target object normal vector prepared by the processing of the preparation step to a reference object normal vector obtained from the shape of the reference object; and an image correcting step of correcting the image of the target object on the basis of the correspondence made by the processing of the correspondence making step.

According to the present invention, there is also provided a recording medium having a computer-readable program recorded thereon, the program being adapted for image processing for correcting the influence of a light source on a target object by measuring the target object and a reference object, the shape and image of which are known, the program including: a first obtaining step of obtaining the result of measurement of the shape of the target object; a second obtaining step of obtaining an image of the target object; a preparation step of preparing a target object normal vector from the shape of the target object obtained by the processing of the first obtaining step; a correspondence making step of making correspondence of the target object normal vector prepared by the processing of the preparation step to a reference object normal vector obtained from the shape of the reference object; and an image correcting step of correcting the image of the target object on the basis of the correspondence made by the processing of the correspondence making step.

According to the present invention, there is also provided an image processing device for correcting the influence of a light source on a target object by measuring the target object and a reference object, the shape and image of which are known, the device including: a shape measuring unit for measuring the shape of the target object; an image pickup unit for picking up an image of the target object; a preparation unit for preparing a target object normal vector from the shape of the target object measured by the shape measuring unit; a correspondence making unit for making correspondence of the target object normal vector prepared by the preparation unit to a reference object normal vector obtained from the shape of the reference object; an image correcting unit for correcting the image of the target object on the basis of the correspondence made by the correspondence making unit; a light source influence adding unit for adding the influence of a light source to the image of the target object corrected by the image correcting unit; and an image output unit for outputting the image having the influence of the light source added thereto by the light source influence adding unit.

According to the present invention, there is also provided an image processing method for an image processing device for correcting the influence of a light source on a target object by measuring the target object and a reference object, the shape and image of which are known, the method including: a shape measuring step of measuring the shape of the target object; an image pickup step of picking up an image of the target object; a preparation step of preparing a target object normal vector from the shape of the target object measured by the processing of the shape measuring step; a correspondence making step of correspondence of the target object normal vector prepared by the processing of the preparation step to a reference object normal vector obtained from the shape of the reference object; an image correcting step of correcting the image of the target object on the basis of the correspondence made by the processing of the correspondence making step; a light source influence adding step of adding the influence of a light source to the image of the target object corrected by the image correcting step; and an image output step of outputting the image having the influence of the light source added thereto by the light source influence adding step.

According to the present invention, there is also provided a recording medium having a computer-readable program recorded thereon, the program being adapted for image processing for correcting the influence of a light source on a target object by measuring the target object and a reference object, the shape and image of which are known, the program including: a first obtaining step of obtaining the result of measurement of the shape of the target object; a second obtaining step of obtaining an image of the target object; a preparation step of preparing a target object normal vector from the shape of the target object obtained by the processing of the first obtaining step; a correspondence making step of correspondence of the target object normal vector prepared by the processing of the preparation step to a reference object normal vector obtained from the shape of the reference object; an image correcting step of correcting the image of the target object on the basis of the correspondence made by the processing of the correspondence making step; a light source influence adding step of adding the influence of a light source to the image of the target object corrected by the image correcting step; and an image output step of outputting the image having the influence of the light source added thereto by the light source influence adding step.

According to the present invention, there is also provided an image processing device for correcting the influence of a light source on a target object by measuring the target object and a reference object, the shape and image of which are known, the device including: a shape measuring unit for measuring a number of shapes of the target object; an image pickup unit for picking up a number of images of the target object; a restructuring unit for restructuring the number of shapes of the target object measured by the shape measuring unit; a preparation unit for preparing a restructured shape normal vector from the shapes of the target object restructured by the restructuring unit; a correspondence making unit for making correspondence of the restructured shape normal vector prepared by the preparation unit to a reference object normal vector obtained from the shape of the reference object; an image correcting means for correcting the number of images of the target object on the basis of the correspondence made by the correspondence making unit; and an image synthesizing unit for synthesizing the number of images of the target object corrected by the correcting unit.

According to the present invention, there is also provided an image processing method for an image processing device for correcting the influence of a light source on a target object by measuring the target object and a reference object, the shape and image of which are known, the method including: a shape measuring step of measuring a number of shapes of the target object; an image pickup step of picking up a number of images of the target object; a restructuring step of restructuring the number of shapes of the target object measured by the processing of the shape measuring step; a preparation step of preparing a restructured shape normal vector from the shapes of the target object restructured by the processing of the restructuring step; a correspondence making step of making correspondence of the restructured shape normal vector prepared by the processing of the preparation step to a reference object normal vector obtained from the shape of the reference object; an image correcting step of correcting the number of images of the target object on the basis of the correspondence made by the processing of the correspondence making step; and an image synthesizing step of synthesizing the number of images of the target object corrected by the processing of the correcting step.

According to the present invention, there is also provided a recording medium having a computer-readable program recorded thereon, the program being adapted for image processing for correcting the influence of a light source on a target object by measuring the target object and a reference object, the shape and image of which are known, the program including: a first obtaining step of obtaining the result of measurement of a number of shapes of the target object; a second obtaining step of obtaining a number of images of the target object; a restructuring step of restructuring the number of shapes of the target object obtained by the processing of the first obtaining step; a preparation step of preparing a restructured shape normal vector from the shapes of the target object restructured by the processing of the restructuring step; a correspondence making step of making correspondence of the restructured shape normal vector prepared by the processing of the preparation step to a reference object normal vector obtained from the shape of the reference object; an image correcting step of correcting the number of images of the target object on the basis of the correspondence made by the processing of the correspondence making step; and an image synthesizing step of synthesizing the number of images of the target object corrected by the processing of the correcting step.

According to the present invention, there is also provided an image processing device for correcting the influence of a light source on a target object by measuring the target object and a reference object, the shape and image of which are known, the device including: a shape measuring unit for measuring a number of shapes of the target object; an image pickup unit for picking up a number of images of the target object; a restructuring unit for restructuring the number of shapes of the target object measured by the shape measuring unit; a preparation unit for preparing a restructured shape normal vector from the shapes of the target object restructured by the restructuring unit; a correspondence making unit for making correspondence of the restructured shape normal vector prepared by the preparation unit to a reference object normal vector obtained from the shape of the reference object; an image correcting unit for correcting the number of images of the target object on the basis of the correspondence made by the correspondence making unit; an image synthesizing unit for synthesizing the number of images of the target object corrected by the correcting unit; a light source influence adding unit for adding the influence of a light source to the image of the target object synthesized by the image synthesizing unit; and an image output unit for outputting the image having the influence of the light source added thereto by the light source influence adding unit.

According to the present invention, there is also provided an image processing method for an image processing device for correcting the influence of a light source on a target object by measuring the target object and a reference object, the shape and image of which are known, the method including: a shape measuring step of measuring a number of shapes of the target object; an image pickup step of picking up a number of images of the target object; a restructuring step of restructuring the number of shapes of the target object measured by the processing of the shape measuring step; a preparation step of preparing a restructured shape normal vector from the shapes of the target object restructured by the processing of the restructuring step; a correspondence making step of making correspondence of the restructured shape normal vector prepared by the processing of the preparation step to a reference object normal vector obtained from the shape of the reference object; an image correcting step of correcting the number of images of the target object on the basis of the correspondence made by the processing of the correspondence making step; an image synthesizing step of synthesizing the number of images of the target object corrected by the processing of the correcting step; a light source influence adding step of adding the influence of a light source to the image of the target object synthesized by the image synthesizing step; and an image output step of outputting the image having the influence of the light source added thereto by the light source influence adding step.

According to the present invention, there is also provided a recording medium having a computer-readable program recorded thereon, the program being adapted for image processing for correcting the influence of a light source on a target object by measuring the target object and a reference object, the shape and image of which are known, the program including: a first obtaining step of obtaining the result of measurement of a number of shapes of the target object; a second obtaining step of obtaining a number of images of the target object; a restructuring step of restructuring the number of shapes of the target object obtained by the processing of the first obtaining step; a preparation step of preparing a restructured shape normal vector from the shapes of the target object restructured by the processing of the restructuring step; a correspondence making step of making correspondence of the restructured shape normal vector prepared by the processing of the preparation step to a reference object normal vector obtained from the shape of the reference object; an image correcting step of correcting the number of images of the target object on the basis of the correspondence made by the processing of the correspondence making step; an image synthesizing step of synthesizing the number of images of the target object corrected by the processing of the correcting step; a light source influence adding step of adding the influence of a light source to the image of the target object synthesized by the image synthesizing step; and an image output step of outputting the image having the influence of the light source added thereto by the light source influence adding step.

Additional features and advantages of the present invention are described in, and will be apparent from, the following detailed description of the invent and the figures.

DETAILED DESCRIPTION OF THE INVENTION

Figure 1:
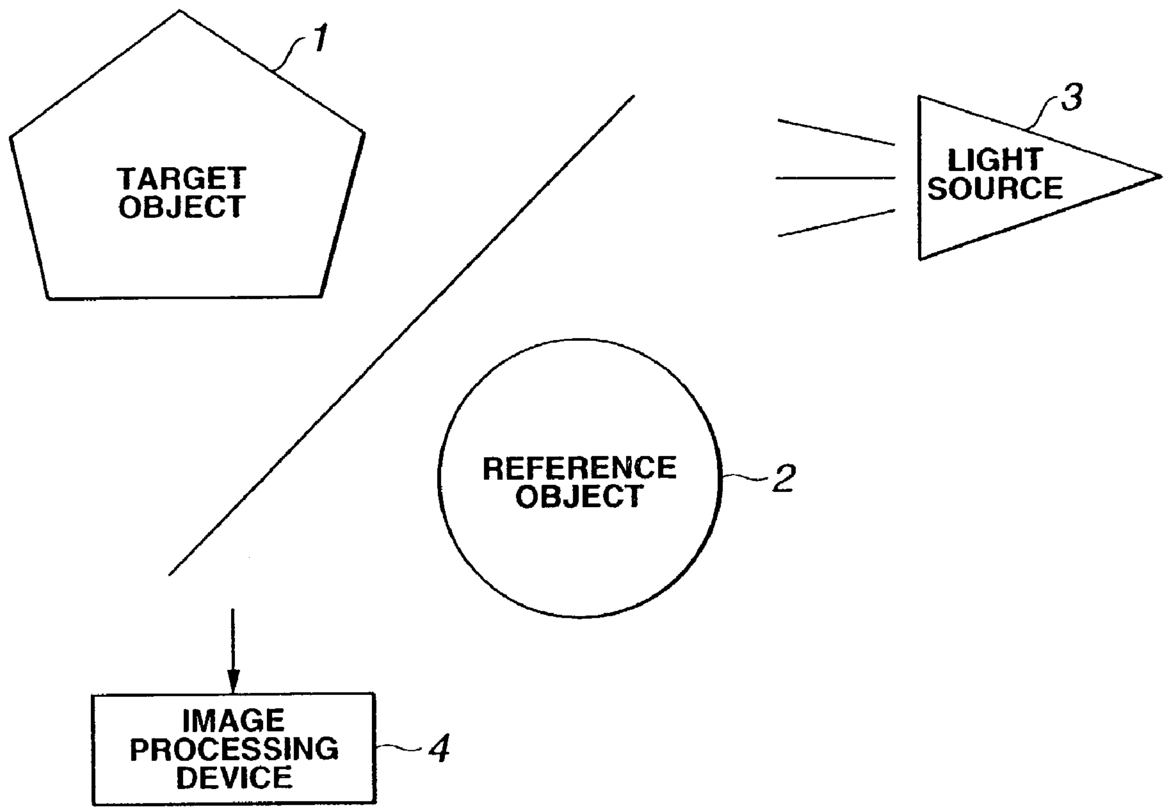
FIG. 1 illustrates the principle of a first embodiment to which the present invention is applied.

FIG. 1 illustrates the principle of a first embodiment to which the present invention is applied. According to this principle, a corrected image under a new light source is produced after the influence of a light source is eliminated from an image obtained by shooting a target object 1.

The target object 1 is a target object for measurement. A reference object 2 is an object, the shape and image of which are known, and which is shot under the same light source 3 as in the case of the target object 1 so as to learn the state of the light source 3. The light source 3 is a light source for illuminating the target object 1 and may be constituted by a number of light sources. An image processing device 4 is adapted for shooting an image of the target object 1 and correcting the influence of the light source 3.

Figure 2:
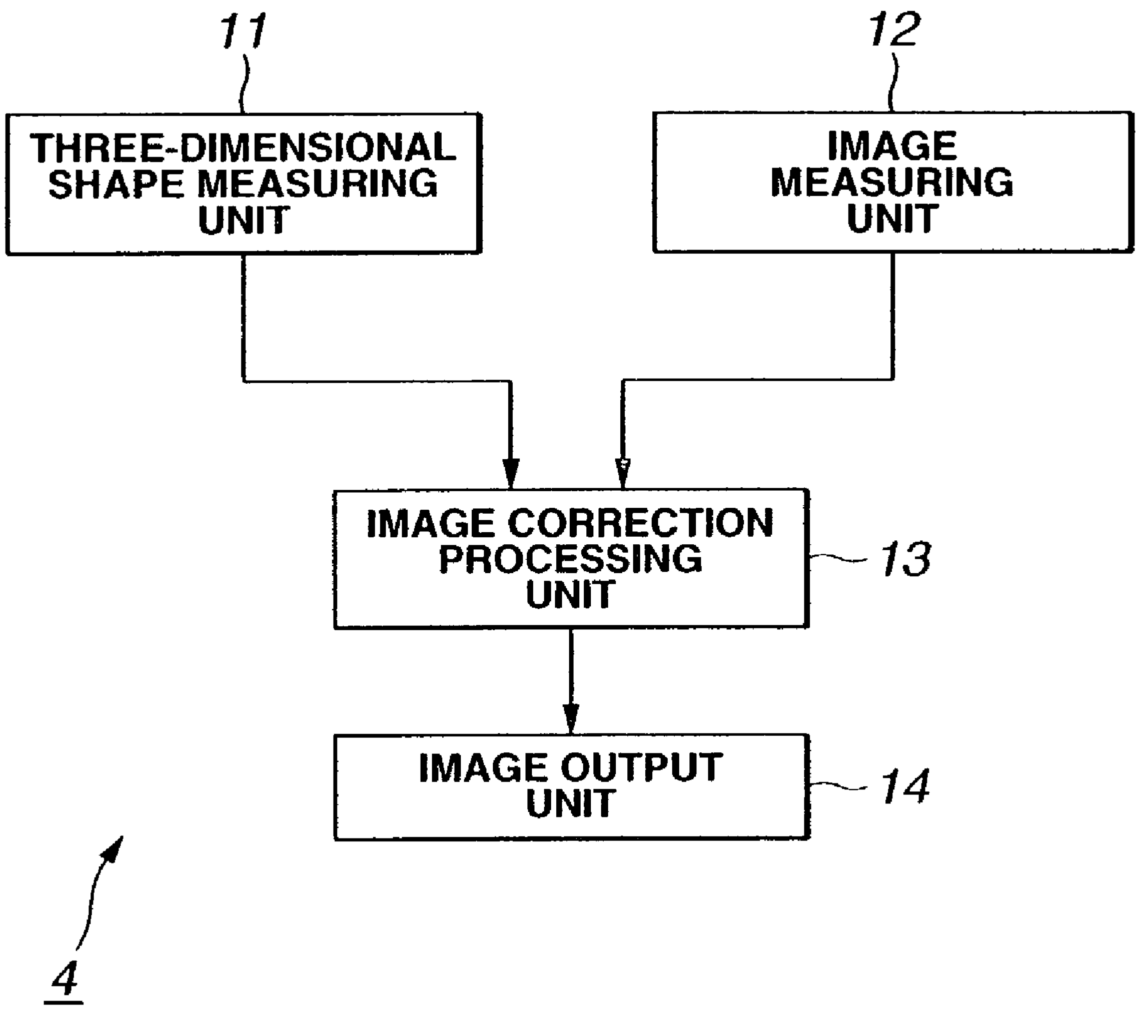
FIG. 2 is a block diagram showing an exemplary structure of a first embodiment of an image processing device to which the present invention is applied.

FIG. 2 shows an exemplary structure of a first embodiment of the image processing device 4 to which the present invention is applied.

A three-dimensional shape measuring unit 11 is constituted, for example, by a laser range finder or a stereo camera. The three-dimensional shape measuring unit 11 obtains target object shape data by measuring the shape of the target object 1 illuminated by a light from the light source 3. The three-dimensional shape measuring unit 11 also prepared target object normal data from the obtained target object shape data.

An image measuring unit 12 obtains target object image data and reference object image data by shooting the target object 1 and the reference object 2.

An image correction processing unit 13 corrects the target object image data measured by the image measuring unit 12 on the basis of the target object shape data supplied from the three-dimensional shape measuring unit 11 and the target object image data and the reference object image data supplied from the image measuring unit 12, thus obtaining target object corrected image data of the target object 1.

An image output unit 14 is constituted, for example, by a CRT (cathode ray tube) or an LCD (liquid crystal display). The image output unit 14 outputs (displays) the target object corrected image data supplied from the image correction processing unit 13.

Figure 3:
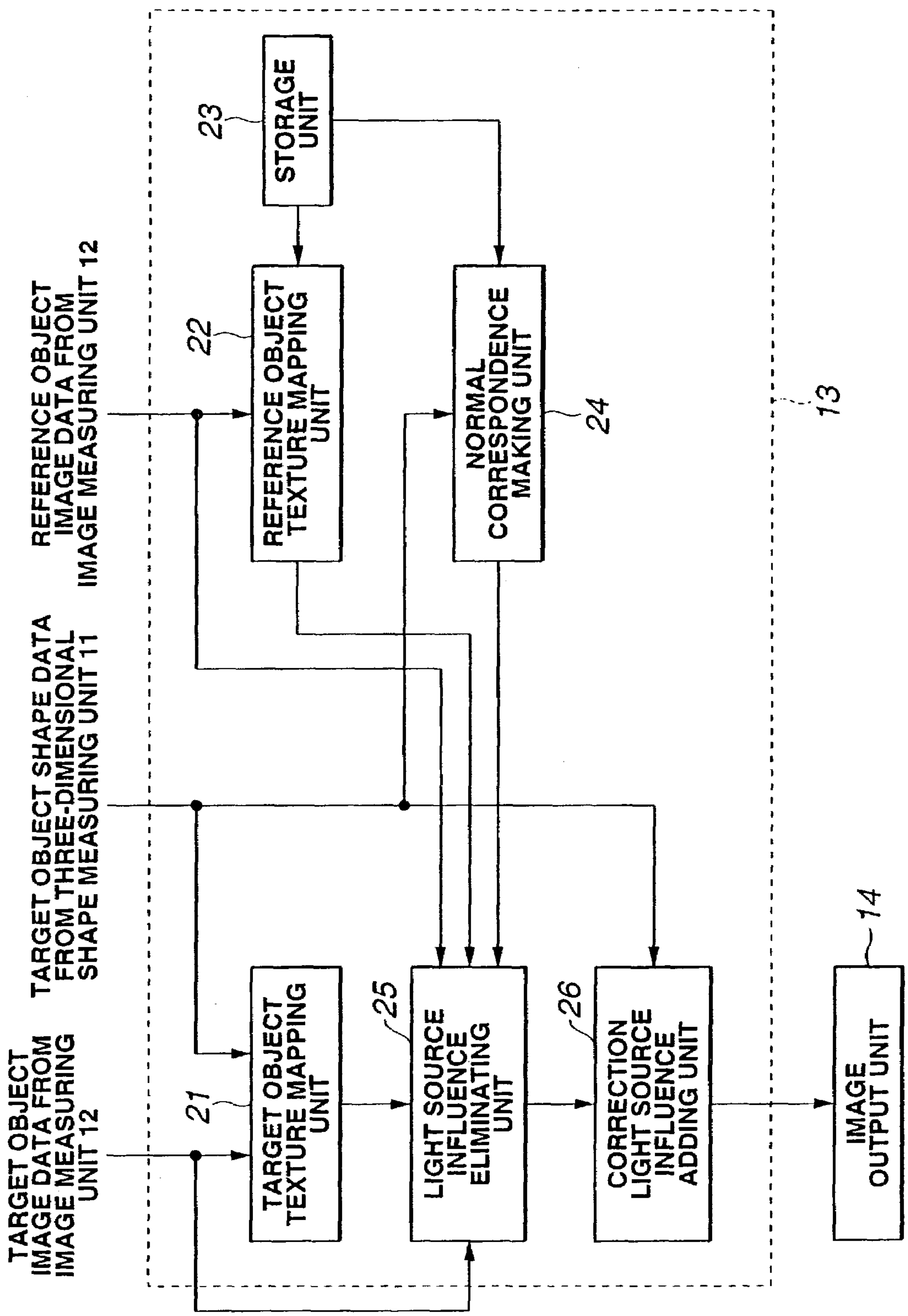
FIG. 3 is a block diagram showing a detailed exemplary structure of an image correction processing unit of FIG. 2.

FIG. 3 shows a detailed exemplary structure of the image correction processing unit 13.

A target object texture mapping unit 21 carries out texture mapping between the target object image data supplied from the image measuring unit 12 and the target object shape data supplied from the three-dimensional shape measuring unit 11. Thus, the correspondence of the target object image data to the target object shape data is made.

A reference object texture mapping unit 22 carries out texture mapping between the reference object image data supplied from the image measuring unit 12 and a shape model of the reference object 2 (hereinafter referred to as reference object shape model) stored in a storage unit 23 in advance. Thus, the correspondence of the reference object image data to the reference object shape model is made.

The reference object shape model is stored in the storage unit 23 in advance. However, the shape data of the reference object 2 also may be obtained and stored into the storage unit 23, for example, by measuring the shape data by the three-dimensional shape measuring unit 11 simultaneously with the measurement of the reference object image data by the image measuring unit 12.

A normal correspondence making unit 24 compares the target object normal data of the target object 1 prepared by the three-dimensional shape measuring unit 11 with reference object normal data of the reference object 2 read out from the storage unit 23, and makes correspondence of the normals having the same directions or substantially the same directions (corresponding direction).

The target object normal data of the target object 1 is obtained by finding the normal direction at each pixel of the target object image data since the correspondence of the target object image data to the target object shape data is made by the target object texture mapping unit 21. The reference object normal data of the reference object 2 is obtained by finding the normal direction at each pixel of the reference object image data since the correspondence of the reference object image data to the reference object shape model is made by the reference object texture mapping unit 22.

A light source influence eliminating unit 25 finds a pixel value of the corresponding reference object image data of the same normal direction or substantially the same normal direction at each pixel of the target object image data supplied from the image measuring unit 12, on the basis of the correspondence made by the normal correspondence making unit 24, and then divides the pixel value of the target object image data by the pixel value of the reference object image data of the corresponding normal direction, thus finding target object light source influence-eliminated image data.

A correction light source influence adding unit 26 adds an influence of the light source to the target object shape data supplied from the three-dimensional shape measuring unit 11, by using a correction light source model, and then multiplies it by the target object light source influence-eliminated image data supplied from the light source influence eliminating unit 25, thus finding target object corrected image data. The correction light source model is a new light source which is preset in consideration of the influence of the light source.

Figure 4:
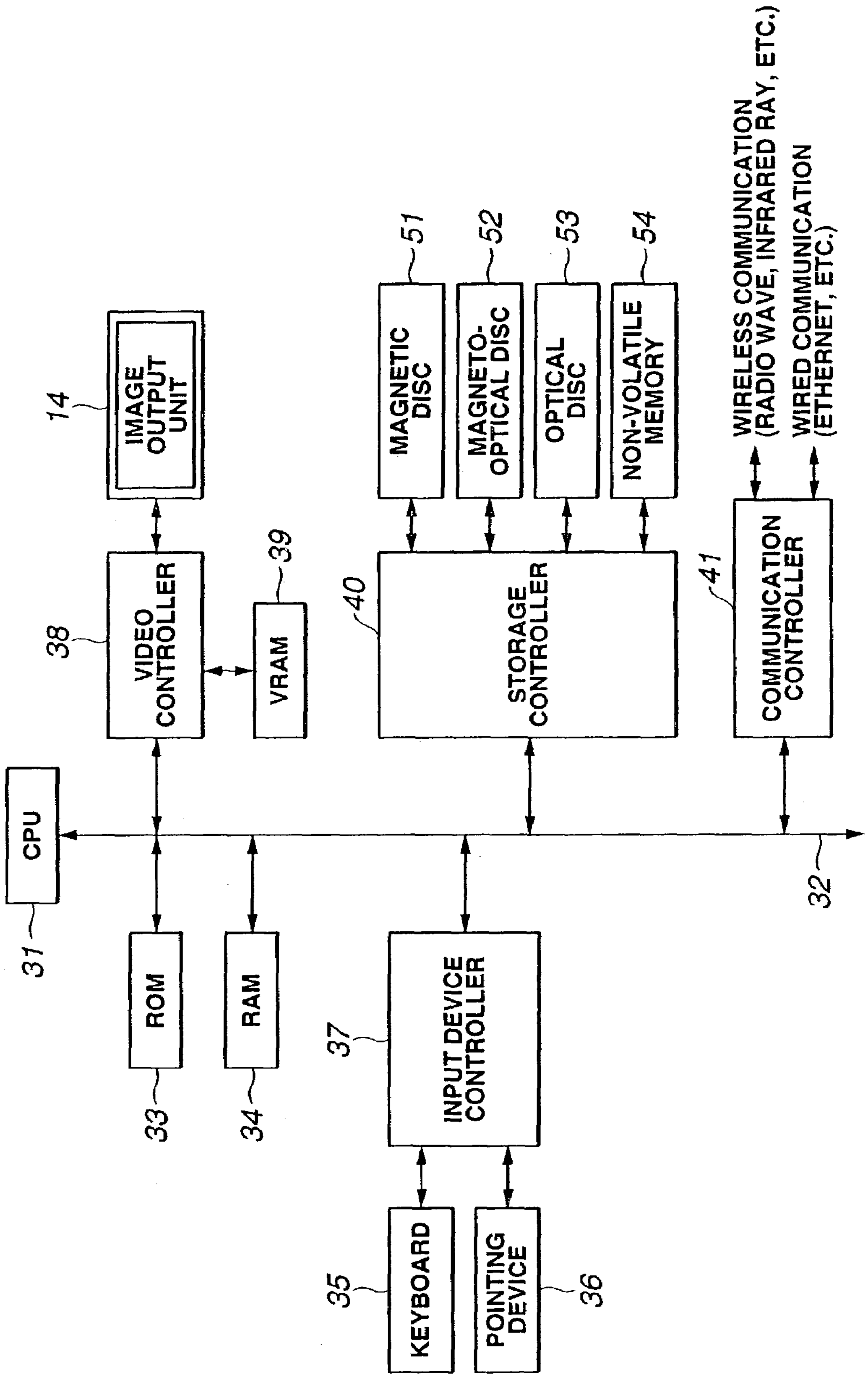
FIG. 4 is a block diagram showing an exemplary electrical structure of hardware for effecting the function of the image correction processing unit of FIG. 3.

FIG. 4 is a block diagram showing an exemplary electrical structure of hardware for effecting the function of the image correction processing unit 13 of FIG. 3.

A CPU (central processing unit) 31 controls each block. A ROM (read only memory) 33 has an IPL (initial program loading) program and the like stored therein. A RAM (random access memory) 34 stores programs for the CPU 31 to carry out processing and necessary data for the operation of the CPU 31.

An input device controller 37 controls a keyboard 35 and a pointing device 36 made up of a mouse or the like. When a user uses the keyboard 35 and the pointing device 36, various commands are inputted to the CPU 31 via the input device controller 37 and a bus 32.

A video controller 38, under the control of the CPU 31, controls the display of the image output unit 14 as a monitor by using a VRAM (video RAM) 39. The VRAM 39 temporarily stores image data to be displayed by the image output unit 14. Specifically, the image data to be displayed is written into the VRAM 39 via the video controller 38 and the image data stored in the VRAM 39 is read out and supplied to the image output unit 14 by the video controller 38, thus displaying the image.

A storage controller 40 controls access to a magnetic disk 51 such as HD (hard disk) or FD (floppy disk), a magneto-optical disc 52 such as mini disc (trademark), an optical disc 53 such as CD-ROM (compact disc ROM), and a non-volatile memory 54 such as ROM or flash memory. The magnetic disk 51, the magneto-optical disc 52, the optical disc 53 and the non-volatile memory 54 store data and these data are read out by the CPU 31 via the storage controller 40. On the magnetic disk 51 and the other disks, the programs for the CPU 31 to carry out the above-described processing are also stored.

A communication controller 41 controls wireless communication using radio waves and infrared rays, and wired communication using the Ethernet (trademark) and the like. For example, various image data and the programs for the CPU 31 to carry out various processing also can be obtained from an external device by communicating via the communication controller 41.

The CPU 31, the ROM 33, the RAM 34, the input device controller 37, the video controller 38, the storage controller 40 and the communication controller 41 are interconnected via the bus 32.

The luminance in the case where the target object 1 and the reference object 2 are illuminated by the light source 3 will now be described. The light source 3 is a point source at infinity and may be constituted by a number of light sources.

It is assumed that the target object 1 is an object conformable to a perfect diffuse reflection model which includes no specular reflection components. The luminance of this target object 1 is expressed by the following equation (1).

$$Itex(p) = Ktex(p)\sum_i \vec{N}_{tex}(p)\cdot\vec{S}i \tag{1}$$

In this equation, Itex(p) represents the luminance (target object image data) at a point p on the surface of the target object 1, and Ktex(p) represents the object color (original color, that is, target object light source influence-eliminated image data) at the point p. $N_{tex}(p)$ represents the normal direction vector (target object normal data), and Si represents the light source direction vector (light source 3).

It is assumed that the reference object 2 is an object conformable to the perfect diffuse reflection model and is a uniform white sphere. The luminance of this reference object 2 is expressed by the following equation (2).

$$Iball(q) = \sum_i \vec{N}_{ball}(q)\cdot\vec{S}i \tag{2}$$

In this equation, Iball(q) represents the luminance (reference object image data) at a point q on the surface of the reference object 2, and $N_{ball}(q)$ represents the normal direction vector (reference object normal data). Si represents the light source direction vector (light source 3). Although Kball(q) represents the object color (in this case, white) at the point q, it has a value of 1 and therefore is not described here.

Figure 5:
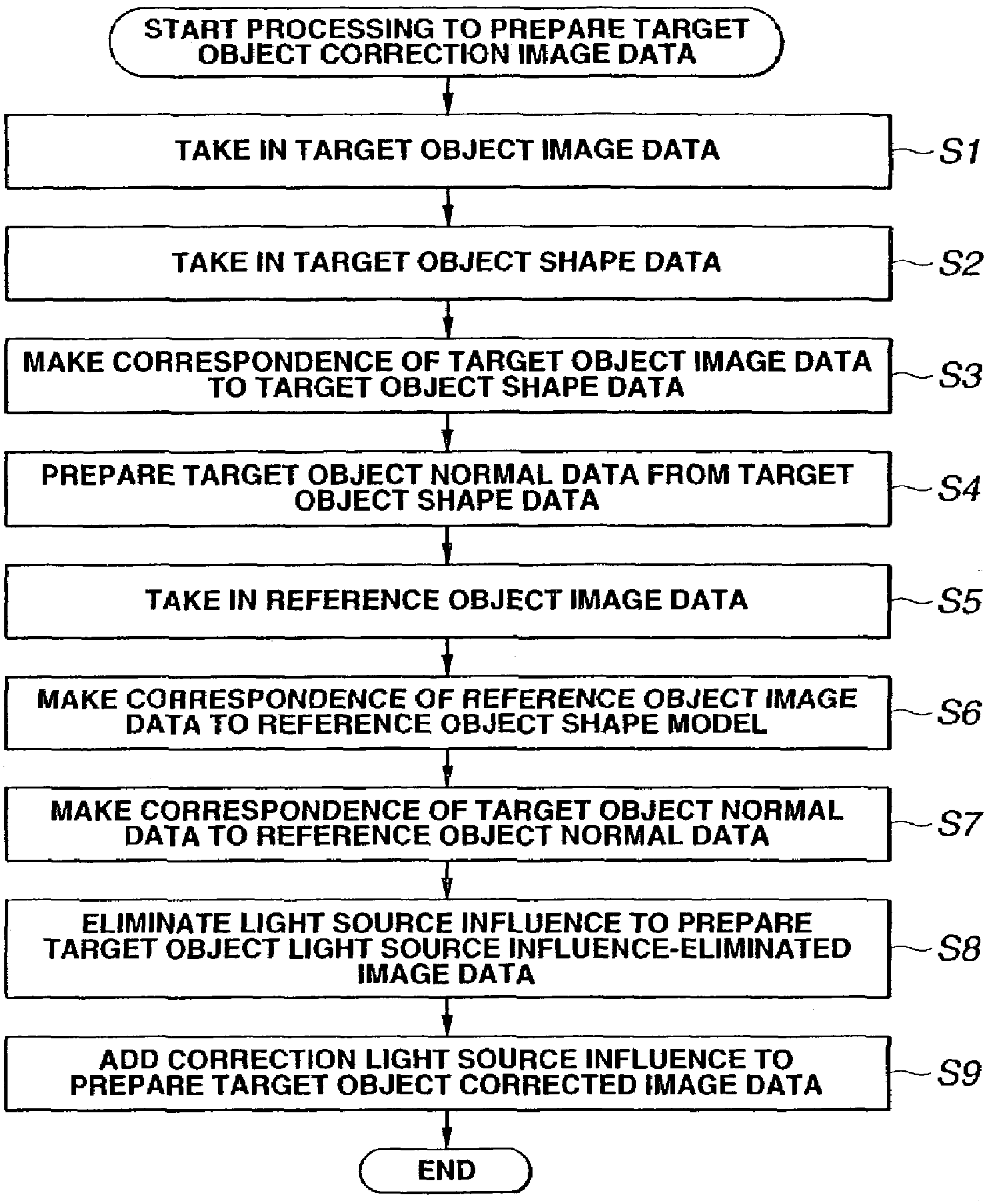
FIG. 5 is a flowchart for explaining the processing to prepare target object corrected image data.

The processing to prepare target object corrected image data, carried out by the image processing device 4, will now be described with reference to the flowchart of FIG. 5.

At step S1, the image measuring unit 12 shoots the target object 1 illuminated by the light source 3, thus taking target object image data therein. At step S2, the three-dimensional shape measuring unit 11 measures the shape of the target object illuminated by the light source 3, thus taking target object shape data therein.

At step S3, the target object texture mapping unit 21 carries out texture mapping between the target object image data taken in by the processing of step S1 and the target object shape data taken in by the processing of step S2, thus making correspondence of the target object image data to the target object shape data.

At step S4, the three-dimensional shape measuring unit 11 prepares target object normal data from the target object shape data taken in by the processing of step S2. Specifically, the three-dimensional shape measuring unit 11 finds the normal direction at each pixel of the target object image data, thereby preparing the target object normal data.

At step S5, the image measuring unit 12 shoots the reference object 2 illuminated by the light source 3, thus taking reference object image data therein. At step S6, the reference object texture mapping unit 22 carries out texture mapping between the reference object image data taken in by the processing of step S5 and a reference object shape model stored in the storage unit 23 in advance, thus making correspondence of the reference object image data to the reference object shape model.

At step S7, the normal correspondence making unit 24 compares with target object normal data prepared by the processing of step S4 with the normal data of the reference object 2 read out from the storage unit 23, and makes correspondence of the normals having the corresponding directions. Specifically, the normal correspondence making unit 24 finds a normal direction vector which holds the relation of the following equation (3), such that the normal direction vectors of the equations (1) and (2) are in the corresponding directions.

$$\vec{N}_{tex}(p)=\vec{N}_{ball}(q) \tag{3}$$

At step S8, the light source influence eliminating unit 25 finds a pixel value of the reference object image data of the corresponding normal direction vector at each pixel of the target object image data on the basis of the correspondence made by the processing of step S7, and then divides the pixel value of the target object image data by the pixel value of the reference object image data of the corresponding normal direction, thus preparing target object light source influence-eliminated image data. That is, the light source influence eliminating unit 25 calculates the target object light source influence-eliminated image data in accordance with the following equation (4).

$$Ktex(p) = \frac{Itex(p)}{Iball(q)} \tag{4}$$

At step S9, the correction light source influence adding unit 26 adds a n influence of the light source to the target object shape data taken in by the processing of step S2, by using the correction light source model, and then multiplies it by the target object light source influence-eliminated image data prepared by the processing of step S8, thus preparing target object corrected image data. That is, the correction light source influence adding unit 26 calculates the target object corrected image data in accordance with the following equation (5).

$$Inew(p) = Ktex(p)\sum_i \vec{N}(p)\cdot\vec{S}_{new}i \quad (5)$$

In this equation, Inew(p) represents the luminance after the correction at the point p on the surface of the target object 1, and $S_{new}i$ represents the light source direction vector of the corrected light source model (new light source).

Through the above-described processing, the image correction processing unit 13 can eliminate the influence of the light source from the texture of the target object 1 that is shot once. Therefore, it is possible to prepare a texture under a new light source that is totally different from the light source in the shooting. It is also possible to reproduce the illuminating environment in the shooting.

Figure 6:
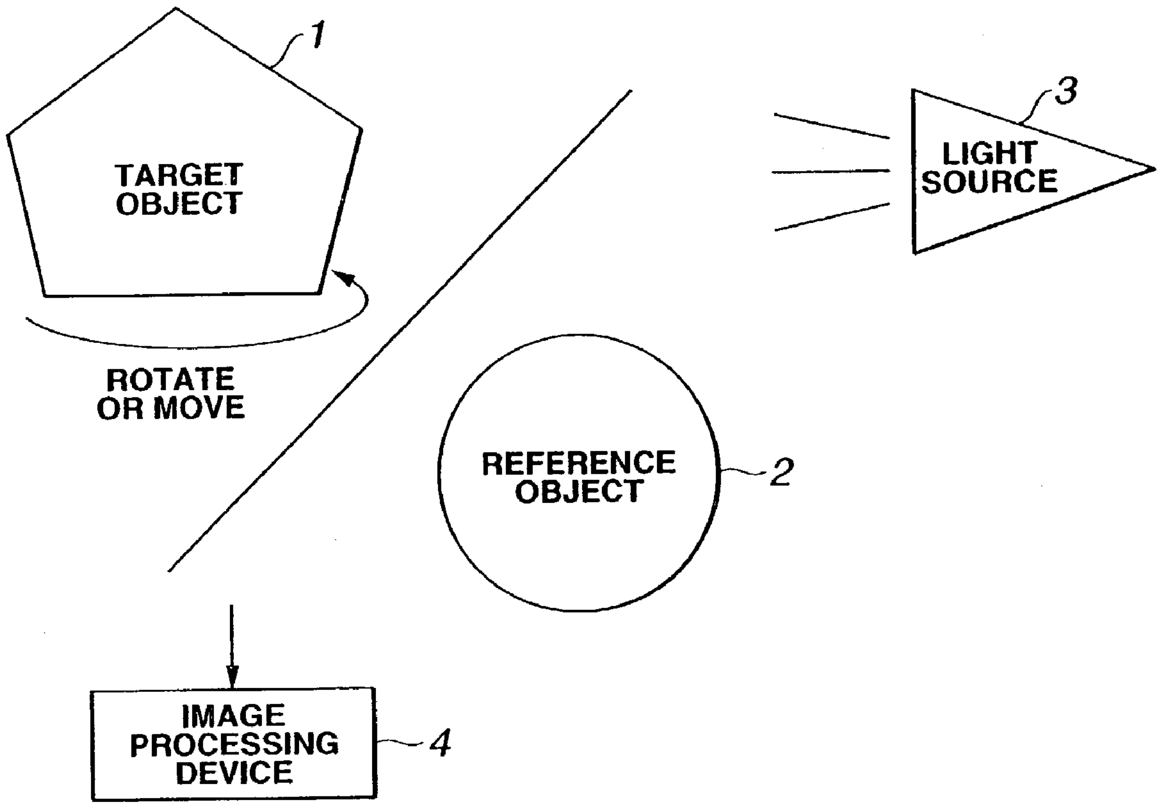
FIG. 6 illustrates the principle of a second embodiment to which the present invention is applied.

FIG. 6 illustrates the principle of a second embodiment to which the present invention is applied. In FIG. 6, portions corresponding to those in FIG. 1 are denoted by the same numerals and will not be described further in detail. According to this principle, after the influence of a light source is eliminated from a number of images obtained by shooting the target object 1, image synthesis is carried out to prepare a corrected image under a new light source.

Figure 7:
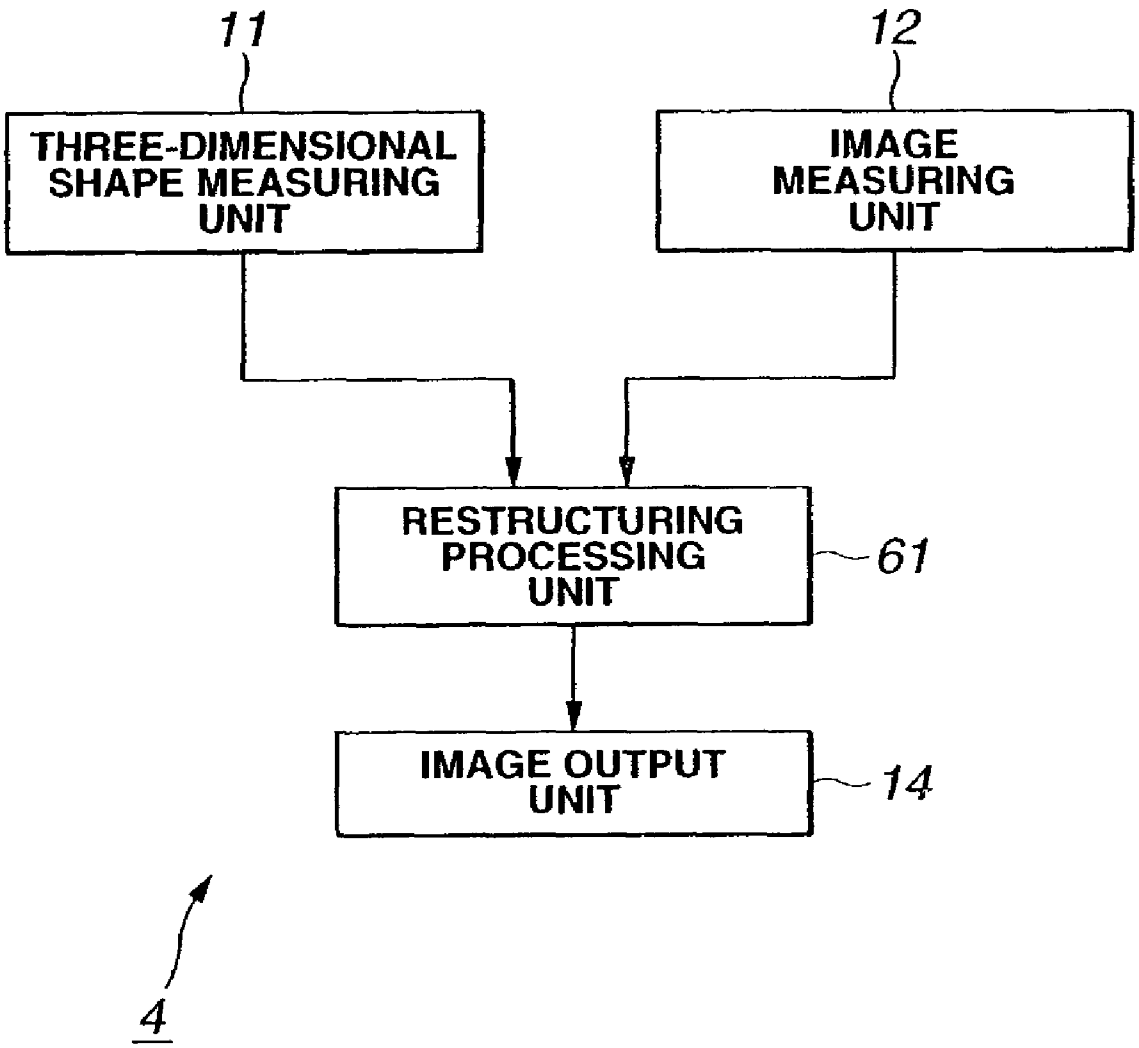
FIG. 7 is a block diagram showing an exemplary structure of a second embodiment of an image processing device to which the present invention is applied.

FIG. 7 shows an exemplary structure of an image processing device in the second embodiment. In FIG. 7, portions corresponding to those in FIG. 2 are denoted by the same numerals and will not be described further in detail. In this exemplary structure, a restructuring processing unit 61 is provided in place of the image correction processing unit 13 and the other parts of the structure are similar to those shown in FIG. 2.

The three-dimensional shape measuring unit 11 rotates or shifts the target object 1 and measures the shape of the target object 1 from a number of directions, thus obtaining target object shape data. The image measuring unit 12 rotates or shifts the target object 1 and shoots an image of the target object 1 from a number of directions, thus obtaining target object image data. The image measuring unit 12 also shoots the reference object 2, thus obtaining reference object image data.

The restructuring processing unit 61 carries out correction of the target object image data measured by the image measuring unit 12 on the basis of a number of target object shape data supplied from the three-dimensional shape measuring unit 11 and a number of target object image data and the reference object image data supplied from the image measuring unit 12, thus obtaining restructured data of the target object 1.

The image output unit 14 outputs (displays) the restructured data supplied from the restructuring processing unit 61. The image output unit 14 also can display the restructured data while rotating or shifting the restructured data, as the mouse or the like is operated by the user.

Figure 8:
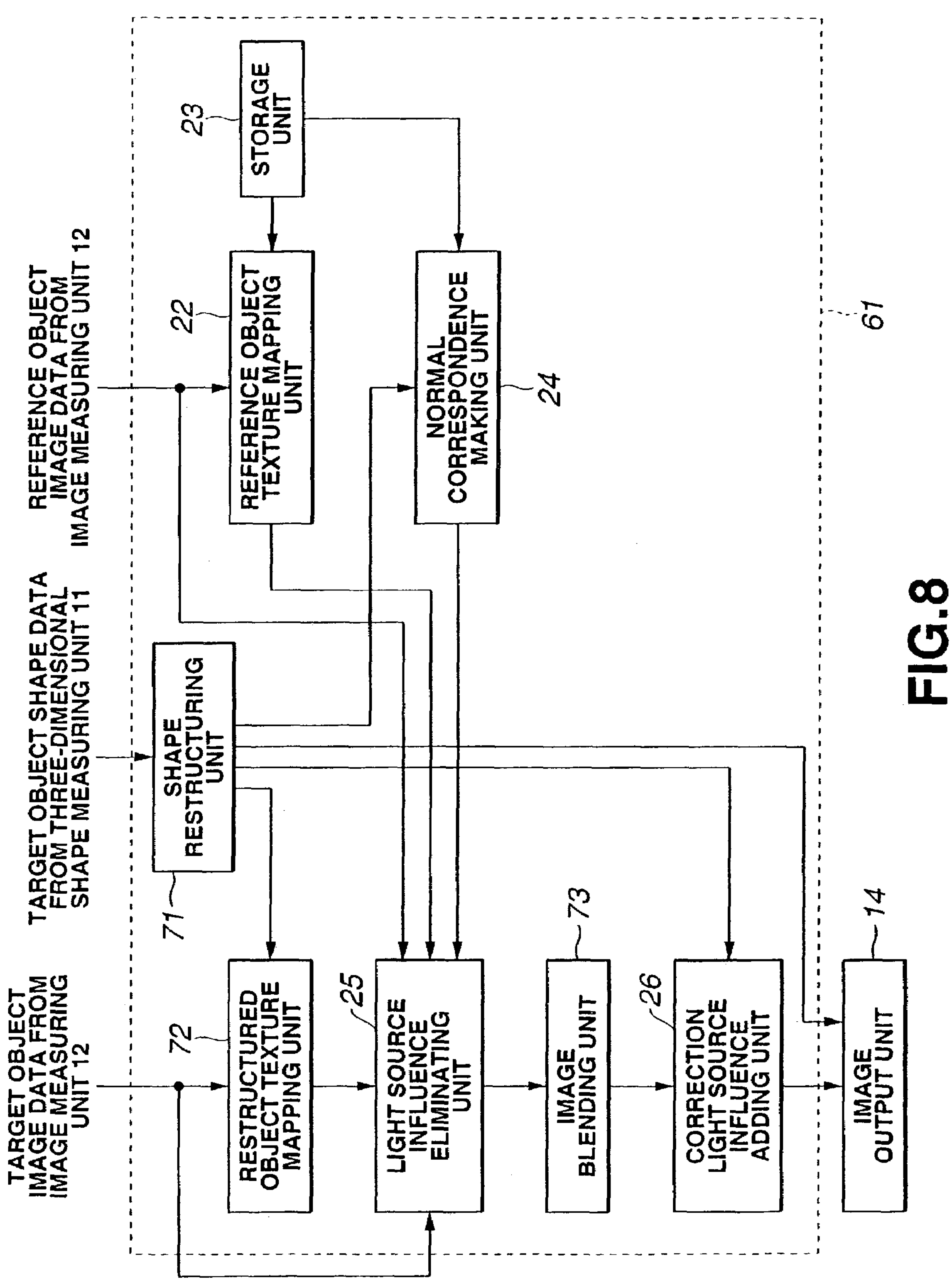
FIG. 8 is a block diagram showing a detailed exemplary structure of a restructuring processing unit of FIG. 7.

FIG. 8 shows a detailed exemplary structure of the restructuring processing unit 61. In FIG. 8, portions corresponding to those in FIG. 3 are denoted by the same numerals and the description of these portions will be suitably omitted. In this exemplary structure, a restructured object texture mapping unit 72 is provided in place of the target object texture mapping unit 21, and a shape restructuring unit 71 and an image blending unit 73 are newly provided. The other parts of the structure are similar to those shown in FIG. 3.

The shape restructuring unit 71 carries out alignment and pasting of the number of target object shape data supplied from the three-dimensional shape measuring unit 11, thus obtaining restructured shape data. As a method for alignment, for example, an ICP (iterative closest point) method is used. As a method for pasting, for example, a volume method is used.

The restructured object texture mapping unit 72 carries out texture mapping between the number of target object image data supplied from the image measuring unit 12 and the restructured shape data supplied from the shape restructuring unit 71. Thus, the correspondence of the number of target object image data to the restructured shape data is made.

The normal correspondence making unit 24 compares restructured shape normal data of the target object 1 obtained from the restructured shape data supplied from the shape restructuring unit 71 with reference object normal data of the reference object 2 obtained from the reference object shape model read out from the storage unit 23, and makes correspondence of the normals having the corresponding directions in accordance with the equation (3).

The restructured shape normal data of the target object 1 is obtained by finding the normal direction at each pixel of the target object image data since the correspondence of the number of target object image data to the restructured shape data is made by the restructured object texture mapping unit 72.

The light source influence eliminating unit 25 finds a pixel value of the reference object image data of the corresponding normal direction at each pixel of the number of target object image data supplied from the image measuring unit 12, on the basis of the correspondence made by the normal correspondence making unit 24, and then divides the pixel values of the number of target object image data by the pixel value of the reference object image data of the corresponding normal direction in accordance with the equation (4), thus finding a number of target object light source influence-eliminated image data.

The image blending unit 73 blends the number of target object light source influence-eliminated image data, from which the influence of the light source has been eliminated, and thus prepares blending image data.

The correction light source influence adding unit 26 adds an influence of the light source to the restructured shape data supplied from the shape restructuring unit 71, by using a correction light source model, and then multiplies it by the blending image data supplied from the image blending unit 73 in accordance with the equation (5), thus finding restructured data.

As described above, in the case of merging the shapes and images (textures) of a target object shot from a number of directions, an image from which the influence of the light source on the target object has been eliminated can be obtained and therefore merging can be carried out without generating any seam of the textures.

In the above-described technique, the influence of the light source can be eliminated to prepare a corrected image of the target object at a low cost without using expensive parts such as a fish-eye lens and a CCD camera.

The above-described series of processing can be carried out either by hardware or by software. When the series of processing is to be carried out by software, a program constituting the software is installed from a recording medium to a computer incorporated in the dedicated hardware or to a general-purpose personal computer which is enabled to carry out various functions by installing various programs.

The recording medium is constituted not only by a packaged medium which has the program recorded thereon and is distributed for providing the program to the user separately from the computer, for example, the magnetic disk 51 (including a floppy disk), the magneto-optical disc 52 (including MD (mini-disc)), the optical disc 53 (including CD-ROM (compact disc-read only memory), DVD (digital versatile disk)), or the non-volatile memory 54, as shown in FIG. 3, but also by the ROM 33 or the storage unit 23 which has the program recorded therein and is incorporated in the computer in advance and thus provided to the user.

In this specification, the steps describing the program recorded on the recording medium include the processing which is carried out in time series in the described order and also include the processing which is not necessarily carried out in time series, but in parallel or individually.

As described above, according to the image processing device and method and the program recorded on the recording medium of the present invention, since an image of a target object is corrected on the basis of the correspondence of a target object normal vector to a reference object normal vector, the influence of the light source can be eliminated from the image of the target object and a corrected image can be prepared.

Moreover, according to the image processing device and method, since a number of images of a target object are corrected on the basis of the correspondence of a restructured shape normal vector to a reference object normal vector and are then synthesized, the influence of the light source can be eliminated from the images of the target object when merging the number of images, and a corrected image can be prepared.

Although the present invention has been described with reference to specific embodiments, those of skill in the art will recognize that changes may be made thereto without departing from the spirit and scope of the invention as set forth in the hereafter appended claims.

The invention claimed is:

1. An image processing device for correcting an influence of a light source on a target object by measuring the target object and a referece object, shapes and images of which are known, the device comprising:

a shape measuring unit for measuring the shape of the target object;

an image pickup unit for picking up the image of the target object;

a preparation unit for preparing a target object normal vector from the shape of the target object measured by the shape measuring unit;

a correspondence making unit for making correspondence of the target object normal vector prepared by the preparation unit to a reference object normal vector obtained from the shape of the reference object; and an image correcting unit for correcting the image of the target object based on the correspondence made by the correspondence making unit.

2. An image processing device as claimed in claim 1, wherein the preparation unit prepares the target object normal vector by finding a normal direction at each pixel of the image of the target object picked up by the image pickup unit.

3. An image processing device as claimed in claim 1, wherein the correspondence making unit makes the correspondence by finding a pixel value of an image of the reference object of a corresponding normal direction from pixel values of the target object normal vector and the reference object normal vector.

4. An image processing device as claimed in claim 3, wherein the image correcting unit divides the pixel value of the image of the target object by the pixel value of the image of the reference object corresponding to normal direction found by the correspondence making unit.

5. An image processing method for an image processing device for correcting an influence of a light source on a target object by measuring the target object and a reference object, shapes and images of which are known, the method comprising the steps of:

measuring the shapes of the target object;

picking up the image of the target object;

preparing a target object normal vector from the shape of the target object measured via the step of measuring;

making correspondence of the target object normal vector prepared via the step of preparing to a reference object normal vector obtained from the shape of the reference object; and correcting the image of the target object based on the correspondence made via the step of making correspondence.

6. An image processing method for an image processing device as claimed in claim 5, wherein the step of preparing the target object normal vector includes finding a normal direction at each pixel of the image of the target object picked up via the step of picking up the image.

7. An image processing method for an image processing device as claimed in claim 5, wherein the step of making correspondence includes dividing a pixel value of the image of the reference object of a corresponding normal direction from pixel values of the target object normal vector and the reference object normal vector.

8. An image processing method for an image processing device as claimed in claim 7, wherein the step of correcting the image of the target object includes dividing the pixel value of the image of the target object by the pixel value found via the step of making correspondence.

9. A computer-readable medium having a computer-readable program recorded thereon, the program being adapted for image processing for correcting an influence of a light source on a target object by measuring the target object and a reference object, shapes and images of which are known, the program comprising:

a first obtaining step of obtaining a result of measurement of the shape of the target object;

a second obtaining step of obtaining an image of the target object;

a preparation step of preparing a target object of normal vector from the shape of the target object obtained via the first obtaining step;

a correspondence making step of making correspondence of the target object normal vector prepared via the preparation step to a reference object normal vector obtained from the shape of the reference object; and an image correcting step of correcting the image of the target object based on the correspondence made via the correspondence making step.

10. A computer readable medium having a computer-readable program recorded thereon as claimed in claim 9, wherein at the preparation step, the target object normal vector is prepared by finding a normal direction at each pixel of the image of the target object obtained via the second obtaining step.

11. A computer readable medium having a computer-readable program recorded thereon as claimed in claim 9, wherein at the correspondence making step, the correspondence is made by finding a pixel value of the image of the reference object of a corresponding normal direction from pixel values of the target objects normal vector and the reference objects normal vector.

12. A computer readable medium having a computer-readable program recorded thereon as claimed in claim 11, wherein at the image correcting step, the pixel value of the image of the target object is divided by the pixel value found via the correspondence making step.

13. An image processing device for correcting an influence of a light source of a target object by measuring the target object and a reference object, shapes and images of which are known, the device comprising:

a shape measuring unit for measuring the shape of the target object;

an image pickup unit for picking up an image of the target object;

a preparation unit for preparing a target object normal vector from the shape of the target object measured by the shape measuring unit;

a correspondence making unit for making correspondence of the target objects normal vector prepared via the preparation unit to a reference object normal vector obtained from the shape of the reference object;

an image correcting unit for correcting the image of the target object based on the correspondence made by the correspondence making unit;

a light source influence adding unit for adding the influence of a light source to the image of the target object corrected by the image correcting unit; and an image output unit for outputting the image having the influence of the light source added thereto by the light source influence adding unit.

14. An image processing device as claimed in claim 13, wherein the preparation unit prepares the target object normal vector by finding a normal direction at each pixel of the image of the target object picked up by the image pickup unit.

15. An image processing device as claimed in claim 13, wherein the correspondence making unit makes the correspondence by finding a pixel value of the image of the reference object of a corresponding normal direction from pixel values of the target object normal vector and the reference object normal vector.

16. An image processing device as claimed in claim 15, wherein the image correcting unit divides the pixel value of the image of the target object by the pixel value found via the correspondence making unit.

17. An image processing method for an image processing device for correcting an influence of a light source on a target object by measuring the target object and a reference object, shapes and images of which are known, the method comprising the steps of:

measuring the shape of the target object;

picking up the image of the target object;

preparing a target object normal vector from the shape of the target object measured via the step of measuring;

making correspondence of the target object normal vector prepared via the step of preparing to a reference object normal vector obtained from the shape of the reference object;

correcting the image of the target object based on the correspondence made via the step of making correspondence;

adding the influence of a light source to the image of the target object corrected via the step of correcting; and outputting the image having the influence of the light source added thereto via the step of adding.

18. An image processing method for an image processing device as claimed in claim 17, wherein the step of preparing the target object normal vector includes finding a normal direction at each pixel of the image of the target object picked up via the step of picking up the image.

19. An image processing method for an image processing device as claimed in claim 17, wherein the step of making correspondence includes finding a pixel value of the image of the reference object of a corresponding normal direction from pixel values of the target object normal vector and the reference object normal vector.

20. An image processing method for an image processing device as claimed in claim 19, wherein the step of correcting the image of the target object includes dividing the pixel value of the image of the target object by the pixel value found via the step of making correspondence.

21. A computer readable medium having a computer-readable program recorded thereon, the program being adapted for image processing for correcting an influence of a light source on a target object by measuring the target object and a reference object, shapes and images of which are known, the program comprising:

a first obtaining step of obtaining a result of measurement of the shape of the target object;

a second obtaining step of obtaining the image of the target object;

a preparation step of preparing a target object normal vector from the shape of the target object obtained via the first obtaining step;

a correspondence making step of making correspondence of the target object normal vector prepared via the preparation step to a reference object normal vector obtained from the shape of the reference object;

an image correcting step of correcting the image of the target object based on the correspondence made via the correspondence making step;

a light source influence adding step of adding the influence of a light source to the image of the target object corrected by the image correcting stop; and an image output step for outputting the image having the influence of the light source added thereto via the light source influence adding step.

22. A computer readable medium having a computer-readable program recorded thereon as claimed in claim 21, wherein the preparation step includes finding a normal direction at each pixel of the image of the target object obtained by the second obtaining step.

23. A computer readable medium having a computer-readable program recorded thereon as claimed in claim 21, wherein the correspondence making step includes finding a pixel value of an image of the reference object of a corresponding normal direction from the pixel values of the target object normal vector and the reference object normal vector.

24. A computer readable medium having a computer-readable program recorded thereon as claimed in claim 23, wherein the image correcting step includes dividing the pixel value of the image of the target object by the pixel value found via the correspondence making step.

25. An image processing device for correcting an influence of a light source on a target object by measuring the target object and a reference object, shapes and images of which are known, the device comprising:

a shape measuring unit for measuring a plurality of shapes of the target object;

an image pickup unit for picking up a plurality of images of the target object;

a restructuring unit for restructuring the plurality of shapes of the target object measured by the shaped measuring unit;

a preparation unit for preparing a restructured shape normal vector from the shapes of the target object restructured via the restructuring unit;

a correspondence making unit for making correspondence of the restructured shape normal vector prepared via the preparation unit to a reference object normal vector obtained from the shape of the reference object;

an image correcting unit for correcting the plurality of images of the target object based on the correspondence made via the correspondence making unit; and an image synthesizing unit for synthesizing the plurality of images of the target object corrected via the correcting unit.

26. An image processing device as claimed in claim 25, wherein the preparation unit prepares the restructured shape normal vector by finding a normal direction at each pixel of the image of the target object restructured via the restructuring unit.

27. An image processing device as claimed in claim 25, wherein the correspondence making unit makes the correspondence by ending a pixel value of an image of the reference object of a corresponding normal direction from pixel values of the restructured shape normal vector and the reference object normal vector.

28. An image processing device as claimed in claim 27, wherein the image correcting unit divides the pixel values of the plurality of images of the target object by the pixel value found via the correspondence making unit.

29. An image processing method for an image processing device for correcting an influence of a light source on a target object by measuring the target object and a reference object, shapes and images of which are known, the method comprising the steps of:

measuring a plurality of shapes of the target object;

picking up a plurality of images of the target object;

restructuring the plurality of shapes of the target object measured via the step of measuring;

preparing a restructured shaped normal vector from the shapes of the target object restructured via the step of restructuring;

making correspondence of the restructured shape normal vector prepared via the step of preparing to a reference object normal vector obtained from the shape of the reference object;

correcting the plurality of images of the target object based on the correspondence made via the step of making correspondence; and synthesizing the plurality of images of the target object corrected via the step of correcting.

30. An image processing method for an image processing device as claimed in claim 29, wherein the step of preparing the restructured shape normal vector includes finding a normal direction at each pixel of the image of the target object restructured via the step of restructuring.

31. An image processing method for an image processing device as claimed in claim 29, wherein the step of making correspondence includes finding a pixel value of an image of the reference object of a corresponding normal direction from pixel values of the restructured shape normal vector and the reference object normal vector.

32. An image processing method for an image processing device as claimed in claim 31, wherein the step of correcting the plurality of images includes dividing the pixel values of the plurality of images of the target object by the pixel value found via the step of making correspondence.

33. A computer readable medium having a computer-readable program recorded thereon, the program being adapted for image processing for correcting an influence of a light source on a target object by measuring the target object and a reference object, shapes and images of which are known, the program comprising:

a first obtaining step of obtaining a result of measurement of a plurality of shapes of the target object;

a second obtaining step of obtaining a plurality of images of the target object;

a restructuring step of restructuring the plurality of shapes of the target object obtained via the first obtaining step;

a preparation step of preparing a restructured shape normal vector from the shapes of the target object restructured via the restructuring step;

a correspondence making step of making correspondence of the restructured shape normal vector prepared via the preparation step to a reference object normal vector obtained via from the shape of the reference object;

an image correcting step of correcting the plurality of images of the target object based on the correspondence made via the correspondence making step; and an image synthesizing step of synthesizing the plurality of images of the target object corrected via the correcting step.

34. A computer readable medium having a compute-readable program recorded thereon as claimed in claim 33, wherein the preparation step includes preparing the restructured shape normal vector by finding a normal direction at each pixel of the image of the target object restructured by the restructuring step.

35. A computer readable medium having a computer-readable program recorded thereon as claimed in claim 33, wherein the correspondence making step includes making the correspondence by finding a pixel value of an image of the reference object of a corresponding normal direction from pixel values of the restructured shape normal vector and the reference object normal vector.

36. A computer readable medium having a computer-readable program recorded thereon as claimed in claim 35, wherein the image correcting step includes dividing the pixel values of the plurality of images of the target object by the pixel value found via the correspondence making step.

37. An image processing device for correcting an influence of light source on a target object by measuring the target object and a reference object, shapes and images of which are known, the device comprising:

a shape measuring unit for measuring a plurality of shapes of the target object;

an image pick up unit for picking up a plurality of images of the target object;

a restructuring unit for restructuring the plurality of shapes of the target object measured via the shape measuring unit;

a preparation unit for preparing a restructured shape normal vector from the shapes of the target object restructured via the restructuring unit;

a correspondence making unit for making correspondence of the restructured shape normal vector prepared via the preparation unit to a reference object normal vector obtained from the shape of the reference object;

an image correcting unit for correcting the plurality of images of the target object based on the correspondence made by the correspondence making unit;

an image synthesizing unit for synthesizing the plurality of images of the target object corrected by the correcting unit;

a light source influence adding unit for adding the influence of a light source to the image of the target object synthesized by the image synthesizing unit; and an image output unit for outputting the image having the influence of the light source added thereto via the light source influence adding unit.

38. An image processing device as claimed in claim 37, wherein the preparation unit prepares the restructured shape normal vector by finding a normal direction at each pixel of the image of the target object restructured via the restructuring unit.

39. An image processing device as claimed in claim 37, wherein the correspondence making unit makes the correspondence by finding a pixel value of an image of the reference object of a corresponding normal direction from the pixel values of the restructured shape normal vector and the reference object normal vector.

40. An image processing device as claimed in claim 39, wherein the image correcting unit divides the pixel values of the plurality of images of the target object by the pixel value found via the correspondence making unit.

41. An image processing method for an image processing device for correcting an influence of a light source on a target object by measuring the target object and an reference object, shapes and images of which are known, the method comprising the steps of:

measuring a plurality of shapes of the target object;

picking up a plurality of images of the target object;

restructuring the plurality of shapes of the target object measured via the step of measuring;

preparing a restructured shape normal vector from the shapes of the target object restructured via the step of rest restructuring;

making correspondence of the restructured shape normal vector prepared via the step of preparing to a reference normal vector obtained from the shape of the referenced object;

correcting the plurality of images of the target object based on the correspondence made via the step of making correspondence;

synthesizing the plurality of images of the target object corrected via the step of correcting;

adding the influence of a light source to the image of the target object synthesized via the step of synthesizing; and outputting the image having the influence of the light source added thereto via the step of adding.

42. An image processing method for an image processing device as claimed in claim 41, wherein the step of preparing the restructured shape normal vector includes finding a normal direction at each pixel of the image of the target object restructured via the step of restructuring.

43. An image processing method for an image processing device as claimed in claim 41, wherein the step of making correspondence includes finding a pixel value of the image of the reference object of a corresponding normal direction from pixel values of the restructured shape normal vector and the reference object normal vector.

44. An image processing method for an image processing device claimed in claim 43, wherein the step of correcting includes dividing the pixel values of the plurality of images of the target object by the pixel value found via the step of making correspondence.

45. A computer readable medium having a computer-readable program recorded thereon, the program being adapted for image processing for correcting an influence light source on a target object by measuring the target object and a reference object, shapes and images of which are known, the program comprising:

a first obtaining step of obtaining a result of measurement of a plurality of shapes of the target object;

a second obtaining step of obtaining a plurality of images of the target object;

a restructuring step of restructuring the plurality of shapes of the target object obtained via the first obtaining step;

a preparation step of preparing a restructured shape normal vector from the shapes of the target object restructured via the restructuring step;

a correspondence making step, of making correspondence of the restructured shape normal vector prepared via the preparation step to a reference object normal vector obtained from the shape of the reference object;

an image correcting step of correcting the plurality of images of the target object based on the correspondence made via the correspondence making step;

an image synthesizing step of synthesizing the plurality of the images of the target object corrected via the correcting step;

a light source influencing adding step of adding the influence of a light source to the image of the target object synthesized via the image synthesizing step; and an image output step of outputting the image having the influence of the light source added thereto via the light source influence adding step.

46. A computer readable medium having a computer-readable program recorded thereon as claimed in claim 45, wherein the preparation step includes preparing the restructured shape normal vector by finding a normal direction at each pixel of the image of the target object restructured via the restructuring step.

47. A computer readable medium having a computer readable program recorded thereon as claimed in claim 45, wherein the correspondence making step includes making correspondence by ending a pixel value of an image of the reference object of a corresponding normal direction from pixel values of the restructured shape normal vector and the reference object normal vector.

48. A computer readable medium having a computer-readable program recorded thereon as claimed in claim 47, wherein the map correcting step includes dividing the pixel values of the plurality of images of the target object by the pixel value found via the correspondence making step.

* * * * *